J. J. HARRISON.
AUTOMOBILE BUMPER LOCK.
APPLICATION FILED AUG. 16, 1921.
1,396,369.
Patented Nov. 8, 1921.
2 SHEETS—SHEET 2.
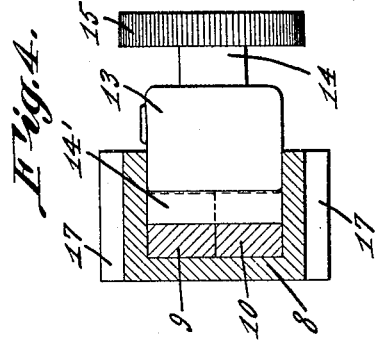
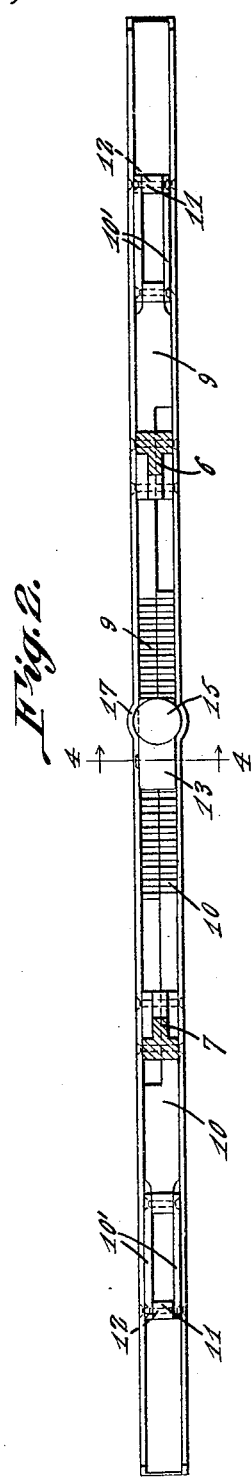
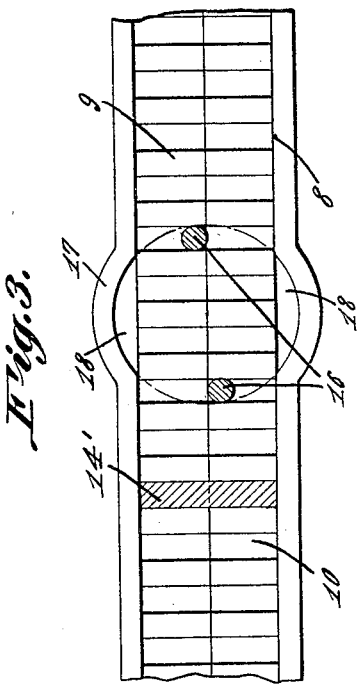
J. J. Harrison, Inventor
By C. A. Snow & Co.
Attorney

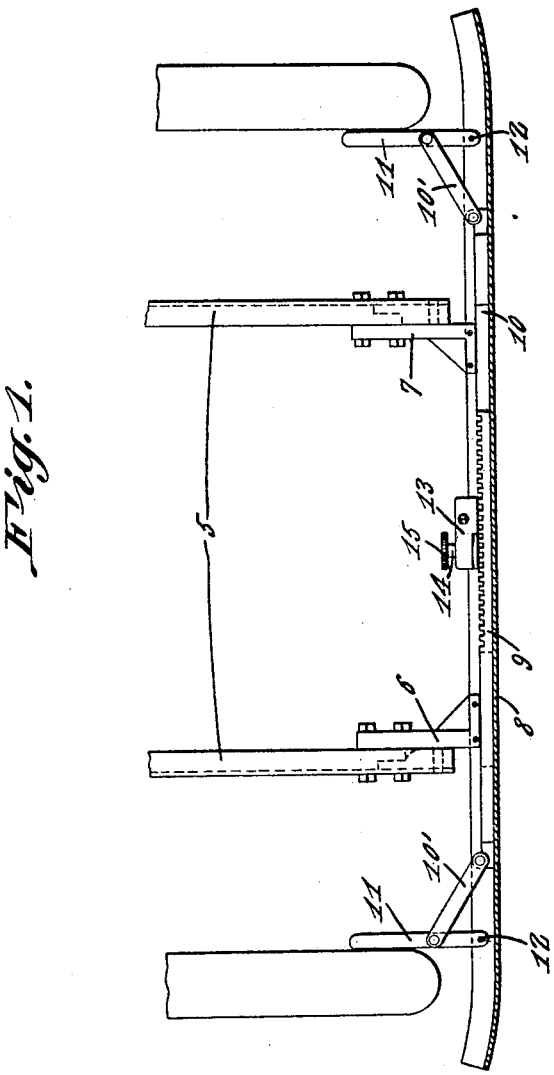

UNITED STATES PATENT OFFICE.

JOHN J. HARRISON, OF PORTLAND, OREGON.

AUTOMOBILE-BUMPER LOCK.

1,396,369.   Specification of Letters Patent.   Patented Nov. 8, 1921.

Application filed August 16, 1921. Serial No. 492,684.

*To all whom it may concern:*

Be it known that I, JOHN J. HARRISON, a citizen of the United States, residing at Portland, in the county of Multnomah and State of Oregon, have invented a new and useful Automobile-Bumper Lock, of which the following is a specification.

This invention has reference to motor vehicle locking devices, and more particularly to a locking device adapted to engage the front wheels of a vehicle to prevent the same from being moved to accomplish the steering of the vehicle.

Another object of the invention is to provide a device of this character controlled by a key, thereby preventing unauthorized persons from moving the vehicle.

A further object of the invention is to provide a lock to be supported by the bumper or front guard of the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a sectional view through a bumper disclosing a locking device constructed in accordance with the present invention, as applied thereto.

Fig. 2 is a rear elevational view of the same.

Fig. 3 is an enlarged detail view of the rack bars, which operate the locking arms.

Fig. 4 is a sectional view taken on line 4—4 of Fig. 2.

Referring to the drawings in detail, the reference character 5 designates the forward ends of the side rails of the chassis of a vehicle, to which are bolted the arms 6 and 7, that support the bumper.

The bumper is of the usual channel iron construction the same being indicated by the reference character 8 and as shown houses the rack bars 9 and 10 respectively, which rack bars have connection with the links 10 that have connection with the locking arms 11, provided at opposite ends of the bumper 8.

These arms 11 are pivotally connected to the bumper 8 as by means of the bolts 12 which pass through suitable opening in the arms 11 and bumper 8, the links 10, which control the movements of the arms 11 being also pivotally connected to the arms.

The arms 9 and 10 slide in the bumper 8, there being provided a housing 13 adjacent the inner ends of the rack bars 9 and 10 which housing carries a locking member 14 that has a head 15 formed on one end thereof, the locking end of the member 14 being formed into a pair of pins 16, which pins may be moved between the teeth of the rack bars, to lock the same against movement. An enlargement 17, forms a part of the bumper 8 and provides clearances 18 for the pins 16 to permit the pins to be moved out of engagement with the rack bars so that the rack bars may be reciprocated to accomplish the moving of the locking arms 11.

As clearly shown by Fig. 1 of the drawings, the arms 11, when in their locked positions, are moved to positions to engage the inner edges of the front wheels of the vehicle, thereby preventing the front wheels from being turned to accomplish the steering of the vehicle. When the arms have been moved to this position it is obvious that the locking pins 16 are moved to positions as shown by Fig. 3 of the drawings to prevent reciprocation of the rack bars. A key may be inserted in the key opening of the housing 13 to lock the pins in their locked positions.

Having thus described the invention, what I claim as new is:—

In combination with the bumper and front wheels of a motor vehicle, movable bars carried by the bumper, pivoted arms supported adjacent to the ends of the bumper, links connecting the movable bars and pivoted arms whereby movement of the bars produces a relative movement of the arms, and means for locking the bars against movement.

In testimony that I claim the foregoing as my own, I have hereto affixed my signature in the presence of two witnesses.

JOHN J. HARRISON.

Witnesses:
 SUSAN CRABTREE,
 C. B. SKINNER.